(12) United States Patent
Tseng et al.

(10) Patent No.: US 12,111,525 B2
(45) Date of Patent: Oct. 8, 2024

(54) ELECTRONIC STRUCTURE

(71) Applicant: InnoLux Corporation, Miao-Li County (TW)

(72) Inventors: Yu-Chih Tseng, Miao-Li County (TW); Yu-Chia Huang, Miao-Li County (TW); Chu-Hong Lai, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/377,304

(22) Filed: Oct. 5, 2023

(65) Prior Publication Data

US 2024/0036370 A1 Feb. 1, 2024

Related U.S. Application Data

(63) Continuation of application No. 17/942,186, filed on Sep. 12, 2022, now Pat. No. 11,809,029, which is a continuation of application No. 17/198,281, filed on Mar. 11, 2021, now Pat. No. 11,467,437.

(30) Foreign Application Priority Data

Apr. 8, 2020 (CN) .......................... 202010267650.8

(51) Int. Cl.
G02F 1/1333 (2006.01)
G02F 1/1335 (2006.01)

(52) U.S. Cl.
CPC .. *G02F 1/133305* (2013.01); *G02F 1/133308* (2013.01); *G02F 1/133548* (2021.01)

(58) Field of Classification Search
None
See application file for complete search history.

(56) References Cited

U.S. PATENT DOCUMENTS

| | | | |
|---|---|---|---|
| 2014/0231763 A1* | 8/2014 | Kim | G09G 3/035 438/34 |
| 2017/0133449 A1* | 5/2017 | Kim | H10K 59/353 |
| 2020/0042042 A1* | 2/2020 | Park | H10K 77/111 |

* cited by examiner

*Primary Examiner* — Phu Vu
(74) *Attorney, Agent, or Firm* — Winston Hsu

(57) ABSTRACT

An electronic structure includes a substrate, a plurality of electronic units disposed on the substrate, and a circuit structure electrically connected with at least one of the plurality of electronic units. The substrate has a first flat part and a curved part connected with the first flat part. Two adjacent ones of the plurality of electronic units on the first flat part have a first pitch in a first direction parallel to a surface of the first flat part Another two adjacent ones of the plurality of electronic units on the curved part have a second pitch different from the first pitch in a second direction parallel to a surface of the curved part. In a normal direction of the first flat part, at least a portion of the circuit structure overlaps a region between another two of the plurality of electronic units on the first flat part.

9 Claims, 9 Drawing Sheets

ELECTRONIC STRUCTURE

CROSS REFERENCE TO RELATED APPLICATIONS

This application is a continuation application of U.S. application Ser. No. 17/942,186, filed on Sep. 12, 2022, which is a continuation application of U.S. application Ser. No. 17/198,281, filed on Mar. 11, 2021. The contents of these applications are incorporated herein by reference.

BACKGROUND OF THE DISCLOSURE

1. Field of the Disclosure

The present disclosure relates to an electronic structure, and more particularly, to an electronic structure having a curved part.

2. Description of the Prior Art

In recent years, the operating area in many electronic devices (such as the display area and/or the sensing area) is extended to the lateral surface and/or the back surface. However, the function or quality of the operation area on the lateral surface and/or the back surface is not ideal because of the limitation of the structure of the traditional electromagnetic wave emitting structure (such as the backlight module). Therefore, further changes must be made to the related design to improve the function or quality of the operation area on the lateral surface and/or the back surface.

SUMMARY OF THE DISCLOSURE

An electronic structure is provided in this disclosure. The electronic structure includes a substrate, a plurality of electronic units, and a circuit structure. The substrate has a first flat part and a curved part connected with the first flat part. The plurality of electronic units are disposed on the substrate. Two adjacent ones of the plurality of electronic units on the first flat part have a first pitch in a first direction parallel to a surface of the first flat part, and another two adjacent ones of the plurality of electronic units on the curved part have a second pitch in a second direction parallel to a surface of the curved part. The second pitch is different from the first pitch. The circuit structure is electrically connected with at least one of the plurality of electronic units. In a normal direction of the first flat part, at least a portion of the circuit structure overlaps a region between another two of the plurality of electronic units on the first flat part.

These and other objectives of the present disclosure will no doubt become obvious to those of ordinary skill in the art after reading the following detailed description of the embodiment that is illustrated in the various figures and drawings.

DETAILED DESCRIPTION

Figure 1:
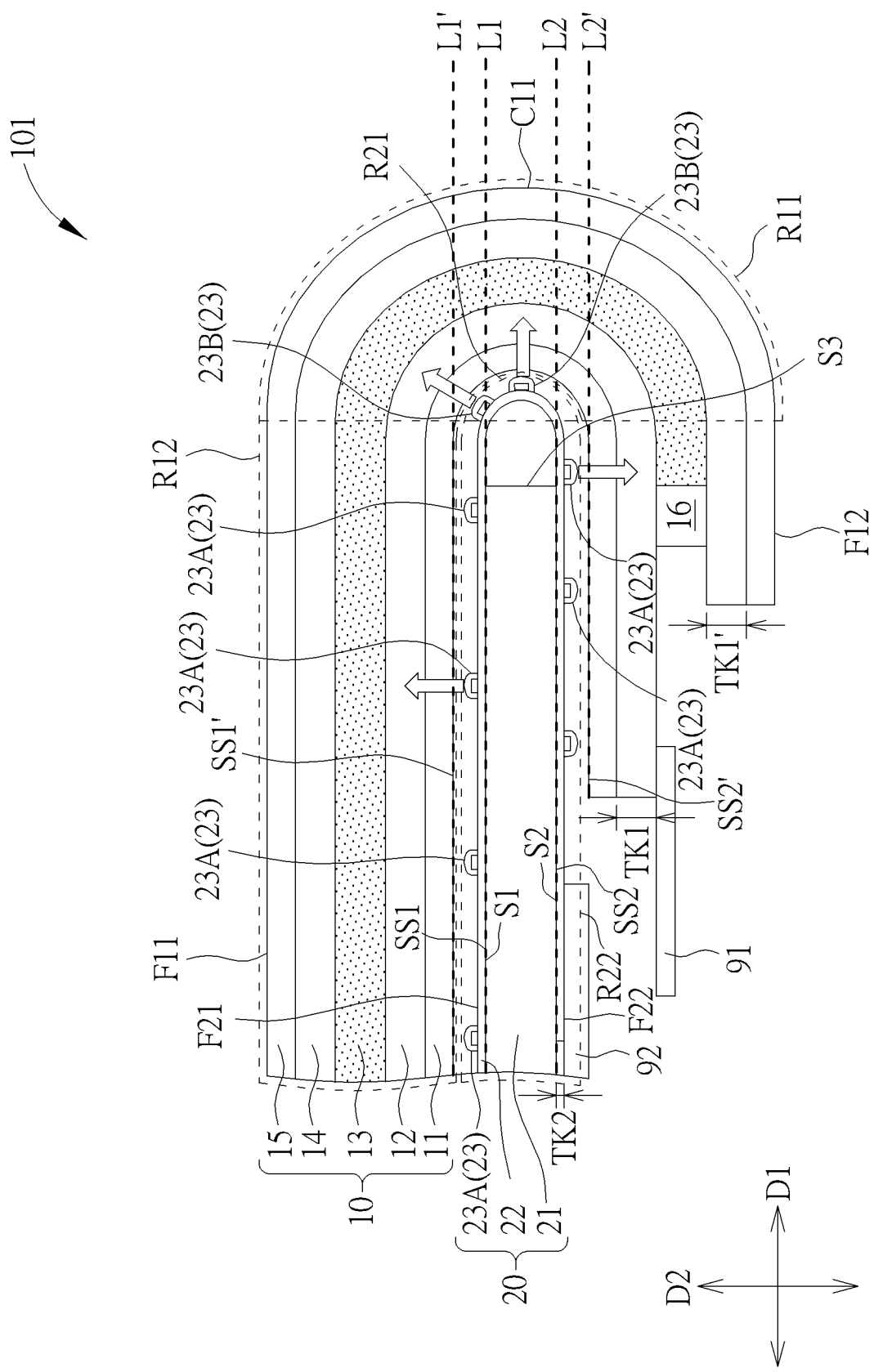
FIG. 1 is a cross-sectional schematic diagram illustrating a part of an electronic device according to a first embodiment of the present disclosure.

This disclosure can be understood by referring to the following detailed description and the accompanying drawings. It should be noted that, in order to make the readers easy to understand and make the drawings concise, only a part of the electronic device is illustrated in the drawings of this disclosure, and the specific elements in the drawing are not drawn to actual scale. In addition, the number and size of each element in the figure are only for illustration, and are not used to limit the scope of this disclosure.

Throughout the specification and the claims, certain words are used to refer to specific elements. Those skilled in the art should understand that electronic device manufacturers may refer to the same components by different names. This article does not intend to distinguish the elements with the same function but different names. In the following specification and claims, words such as "including", "containing", and "having" are open-ended words, so they should be interpreted as meaning "including but not limited to . . . ". Therefore, when the terms "including", "containing" and/or "having" are used in the description of this disclosure, they specify the existence of corresponding features, regions, steps, operations, and/or components, but do not exclude the existence of one or more corresponding features, regions, steps, operations and/or components.

The directional terms mentioned in this description, such as "up", "down", "front", "rear", "left", "right", etc., are only directions with reference to the drawings. Therefore, the directional terms used are for illustration, but not for limiting the disclosure. In the drawings, each drawing depicts the general features of the methods, structures and/or materials used in specific embodiments. However, these drawings should not be regarded as limiting the scope or characteristics of these embodiments. For example, for the sake of clarity, the relative size, thickness, and position of each layer, region, and/or structure may be reduced or enlarged.

When a corresponding element (such as a film layer or unit) is referred to as being "disposed or formed on another element", it may be directly disposed or formed on another element, or there may be other element therebetween. On the other hand, when a component is described to be "directly disposed or formed on another element", there is no element therebetween. In addition, when an element is described as being "disposed or formed on another element", the two have a vertical relationship in the top view direction, and this element may be located above or below the other element, and the vertical relationship depends on the device orientation.

It should be understood that when an element or film layer is referred to as being "connected to" another element or film layer, it can be directly connected to this element or film layer, or there may be an intervening element or film layer therebetween. When an element is described as being "directly connected to" another element or film layer, there is no intervening element or film layer therebetween. In addition, when an element is described as being "coupled to another element (or a variant thereof)", it can be directly connected to this element, or be indirectly connected (such as being electrically connected) to this element through one or more elements.

The terms "about", "equal to", "the same as", "substantially" or "roughly" are generally interpreted as being within 20% of a given value or a given range, or interpreted as being within a given value or a given range within 10%, 5%, 3%, 2%, 1%, or 0.5% of the value or the range.

The ordinal numbers used in the specification and claims, such as the terms "first", "second", etc., are used to modify elements, and they do not imply and mean that the element(s) have any previous ordinal numbers. It does not represent the order of a certain element and another element, or the order of the manufacturing method. The use of these ordinal numbers is only used to clearly distinguish the element with a certain name from another element with the same name. The same terms may not be used in the claims and the specification. Accordingly, the first component in the specification may be the second component in the claims.

It should be noted that the following embodiments can be substituted, reorganized, and mixed to complete other embodiments without departing from the spirit of the present disclosure. As long as the features of the embodiments do not violate or conflict the invention spirit, they can be mixed and combined arbitrarily.

Please refer to FIG. 1. FIG. 1 is a cross-sectional schematic diagram illustrating a part of an electronic device 101 according to a first embodiment of the present disclosure. The electronic device 101 is provided in this embodiment, and the electronic device 101 includes a panel 10 and an electromagnetic wave emitting structure 20. The panel 10 has a first curved portion R11 and a flat portion R12 adjacent to the first curved portion R11. The electromagnetic wave emitting structure 20 has a second curved portion R21 and a flat portion R22 adjacent to the second curved portion R21, and the second curved portion R21 is corresponding to the first curved portion R11. In some embodiments, the electromagnetic wave emitting structure 20 includes a substrate 22 and a plurality of electromagnetic wave emitting units 23. The plurality of electromagnetic wave emitting units 23 are disposed on the substrate 22, and at least one of the plurality of electromagnetic wave emitting units 23 is in the second curved portion R21. The descriptions and definitions about the first curved portion R11, the flat portion R12, the second curved portion R21, and the flat portion R22 will be detailed later.

In some embodiments, the electromagnetic wave emitting structure 20 may further include a support element 21 attached to the substrate 22, and the support element 21 may be used to support the substrate 22. In some embodiments, the hardness or the Young's modulus of the support element 21 may be greater than that of the substrate 22. For example, the substrate 22 may include a flexible substrate, and the support element 21 may include a rigid substrate, but not limited thereto. In some embodiments, the substrate 22 may include a polymer material, such as polyimide (PI), polyethylene terephthalate (PET), other suitable flexible materials, or a combination thereof, but not limited thereto. In some embodiments, the support element 21 may include a glass material, a ceramic material, other suitable materials, or a combination thereof, but not limited thereto. In some embodiments, the support element 21 or the substrate 22 may include a single layer structure or a multiple layer structure. In some embodiments, the thickness (not marked) of the support element 21 may be greater than a thickness TK2 of the substrate 22. In some embodiments, the support element 21 may optionally include a light guide material and/or an anti-reflection material, but not limited thereto. In some embodiments, the support element 21 may have a first surface S1, a second surface S2 opposite to the first surface S1, and a side surface S3 connected with and located between the first surface S1 and the second surface S2. In some embodiments, a part of the substrate 22 is disposed on the support element 21 (on the first surface S1), and another part of the substrate 22 may extend, be folded, and disposed on the support element 21 (on the second surface S2), but not limited thereto. In some embodiments, a portion of the substrate 22 may contact the first surface S1 and/or the second surface S2, a portion of the substrate 22 may do not contact the side surface S3.

Please refer to FIG. 1, in some embodiments, the flat portion R22 of the electromagnetic wave emitting structure 20 may be substantially parallel with a horizontal direction D1 and extend along the horizontal direction D1. Specifically, the part of the substrate 22 disposed on the first surface S1 may have a surface SS1 (a surface of the substrate 22 adjacent to the support element 21), the surface SS1 is substantially parallel with the horizontal direction D1, and an extending plane L1 may extend from the surface SS1. In addition, the part of the substrate 22 disposed on the second surface S2 may have a surface SS2 (a surface of the substrate 22 adjacent to the support element 21), the surface SS2 is substantially parallel with the horizontal direction D1, and an extending plane L2 may extend from the surface SS2. It should be noted that, a portion of the electromagnetic wave emitting structure 20 staggered from the extending plane L1 and/or the extending plane L2 being not parallel with the extending plane L1 and/or the extending plane L2 may be defined as the second curved portion R21, and a portion of the electromagnetic wave emitting structure 20 parallel with the extending plane L1 and/or the extending plane L2 being not staggered from the extending plane L1 and/or the extending plane L2 may be defined as the flat portion R22. It should be noted that the extending plane L1 and the extending plane L2 may be obtained from the surface SS1 and the surface SS2 of the substrate 22 respectively, and the second curved portion R21 and the flat portion R22 may be defined by the approach described above, but not limited thereto. In other embodiments, the extending planes (not marked) similar to the extending plane L1 and/or the extending plane L2 described above may be defined by the inner surfaces of a layer with the minimum bending curvature in the layers stacked in the electromagnetic wave emitting structure 20, a portion of the electromagnetic wave emitting structure 20 staggered from the extending planes being not parallel with the extending planes may be defined as the second curved portion R21, and a portion of the electromagnetic wave emitting structure 20 parallel with the extending planes being not staggered from the extending planes may be defined as the flat portion R22. In other words, a part of the substrate 22 and the support element 21 may be in (or included in) the flat portion R22, and a part of the substrate 22 may be in (or included in) the second curved portion R21. In some embodiments, a part of the substrate 22 in (or included in) the flat portion R22 may be located on the first surface S1 of the support element 21, and a part of the substrate 22 in (or included in) the flat portion R22 may even selectively extend from the first surface S1, but not limited thereto. In some embodiments, a part of the substrate 22 in (or included in) the flat portion R22 may be located on the second surface S2 of the support element 21, and a part of the substrate 22 in (or included in) the flat portion R22 may even selectively extend from the second surface S2, but not limited thereto. In some embodiments, a part of the substrate 22 in (or included in) the second curved portion R21 may be connected with the part of the substrate 22 located on the first surface S1 and the part of the substrate 22 located on the second surface S2 respectively, but not limited thereto. In some embodiments, the electromagnetic wave emitting structure 20 may further include driving elements (not shown) or electrically conductive lines (not shown) disposed on the substrate 22. The driving elements or the electrically conductive lines may be electrically connected with the electromagnetic wave emitting units 23 for driving or operating the electromagnetic wave emitting units 23. In other embodiments, other layers may be optionally inserted between the support element 21 and the substrate 22.

Please refer to FIG. 1. In some embodiments, the panel 10 includes a first substrate 12, a second substrate 14, and a medium layer 13 disposed between the first substrate 12 and the second substrate 14. The first substrate 12 may be disposed between the medium layer 13 (such as a liquid crystal material and/or an electrochromic (EC) material, but not limited thereto) and the electromagnetic wave emitting structure 20. In some embodiments, the panel 10 may include a liquid crystal cell structure. In some embodiments, the electronic device may be regarded as a liquid crystal antenna device. In some embodiments, the panel 10 may include a display device (such as a liquid crystal display cell or a liquid crystal antenna cell), and the electromagnetic wave emitting units 23 may be light emitting units, but not limited thereto. The light emitting unit may include a mini light emitting diode (mini-LED), a micro-LED, a quantum dot light emitting diode (QD-LED or QLED), a phosphorescent material, a fluorescent material, a quantum dot material, other suitable light emitting structures, or a combination thereof, but not limited thereto. In some embodiments, the electromagnetic wave emitting units 23 may be packaged by different encapsulation materials respectively. In other words, one encapsulation layer may be located on or cover one of the electromagnetic wave emitting units 23, but not limited thereto. In some embodiments, the electromagnetic wave emitting units 23 may be packaged by one encapsulation layer (not marked), and the encapsulation layer may be used to package a plurality of the electromagnetic wave emitting units 23 concurrently. In other words, one encapsulation layer may be located on or cover a plurality of the electromagnetic wave emitting units 23, but not limited thereto.

Please refer to FIG. 1. In some embodiments, the panel 10 may further include driving elements (not shown) or circuits (not shown), but not limited thereto. In some embodiments, the panel 10 may further include a color filter layer (not shown) or a shielding layer (not shown) disposed between the first substrate 12 and the second substrate 14, but not limited thereto. In some embodiments, the panel 10 may include a first polarization element 11 and/or a second polarization element 15. In some embodiments, the first polarization element 11 may be disposed between the first substrate 12 (or the medium layer 13) and the electromagnetic wave emitting structure, and the second polarization element 15 may be disposed on a side of the second substrate 14 away from the medium layer 13, but not limited thereto. In other embodiments, the locations of the first polarization element 11 and/or the second polarization element 15 may be adjusted according to some requirements. The first substrate 12 and the second substrate 14 may be a flexible substrate, respectively.

In some embodiments, the panel 10 may have the first curved portion R11 and the flat portion R12 adjacent to the first curved portion R11, and the flat portion R12 may extend along a direction parallel with the horizontal direction D1. In some embodiments, the flat portion R22 may be disposed corresponding to the flat portion R12, and the second curved portion R21 may be disposed corresponding to the first curved portion R11. Specifically, the panel 10 has a first inner surface SS1' (such as a surface of the first polarization element 11) adjacent to the first surface S1 of the support element 21, the first inner surface S S1' is substantially parallel with the horizontal direction D1, and an extending plane L1' may extend from the first inner surface S S1'. In addition, the panel 10 has a second inner surface SS2' (such as a surface of the first polarization element 11) adjacent to the second surface of the support element 21, the second inner surface SS2' is substantially parallel with the horizontal direction D1 and may extend along the horizontal direction D1, and an extending plane L2' may extend from the second inner surface SS2'. It should be noted that, a portion of the panel 10 staggered from the extending plane L1' and/or the extending plane L2' being not parallel with the extending plane L1' and/or the extending plane L2' may be defined as the first curved portion R11, and a portion of the panel 10 parallel with the extending plane L1' and/or the extending plane L2' being not staggered from the extending plane L1 and/or the extending plane L2 may be defined as the flat portion R12. It should be noted that, the first inner surface SS1' and/or the second inner surface S S2' of the panel 10 may be the surfaces of the first polarization element 11 respectively, but not limited thereto. The first inner surface SS1' and/or the second inner surface SS2' of the panel 10 may be the surfaces of the layer included in the panel 10. Extending planes (not marked) similar to the extending plane L1' and the extending plane L2' may be defined by the inner surfaces of a layer with the minimum bending curvature in the layers stacked in the panel 10, a portion of the panel 10 staggered from the extending planes being not parallel with the extending planes may be defined as the first curved portion R11, and a portion of the panel 10 parallel with the extending planes being not staggered from the extending planes may be defined as the flat portion R12.

Please refer to FIG. 1. In some embodiments, a part of the first polarization element 11, a part of the first substrate 12, a part of the medium layer 13, a part of the second substrate 14, and/or a part of the second polarization element 15 in the panel 10 may be in (or included in) the flat portion 12 respectively. In some embodiments, a part of the first polarization element 11, a part of the first substrate 12, a part of the medium layer 13, a part of the second substrate 14, and/or a part of the second polarization element 15 in the panel 10 may be in (or included in) the first curved portion R11. By the design described above, the flat portion R12 and/or the first curved portion R11 of the panel 10 in the electronic device 101 may be used to perform functional operations (such as a display operation, a sensing operation, or other functional operations) selectively. In some embodiments, the first substrate 12 and/or the second substrate 14 may respectively include a polymer material, such as polyimide (PI), polyethylene terephthalate (PET), other suitable flexible materials, or a combination thereof, but not limited thereto. In some embodiments, the thickness of the substrate 22, the thickness of the first substrate 12, and/or the thickness of the second substrate 14 may be adjusted according to the actual demands (such as a consideration of process or a consideration of the degree of bending). In some embodiments, the thickness of the substrate 22, the thickness of the first substrate 12, and the thickness of the second substrate 14 may respectively range from 5 micrometers (um) to 50 micrometers (5 micrometers≤thickness≤50 micrometers), or respectively range from 10 micrometers to 40 micrometers (10 micrometers≤thickness≤40 micrometers), but not limited thereto.

Please refer to FIG. 1. In some embodiments, the thickness of the first polarization element 11 and/or the thickness of the second polarization element 15 may range from 50 micrometers to 500 micrometers (50 micrometers≤thickness≤500 micrometers), or range from 175 micrometers to 300 micrometers (175 micrometers≤thickness≤300 micrometers), but not limited thereto. In some embodiments, the panel 10 may further include an attached element 16 disposed between the first substrate 12 and the second substrate 14. The attached element 16 may surround the medium layer 13, and the attached element 16 may include sealant.

Figure 2:
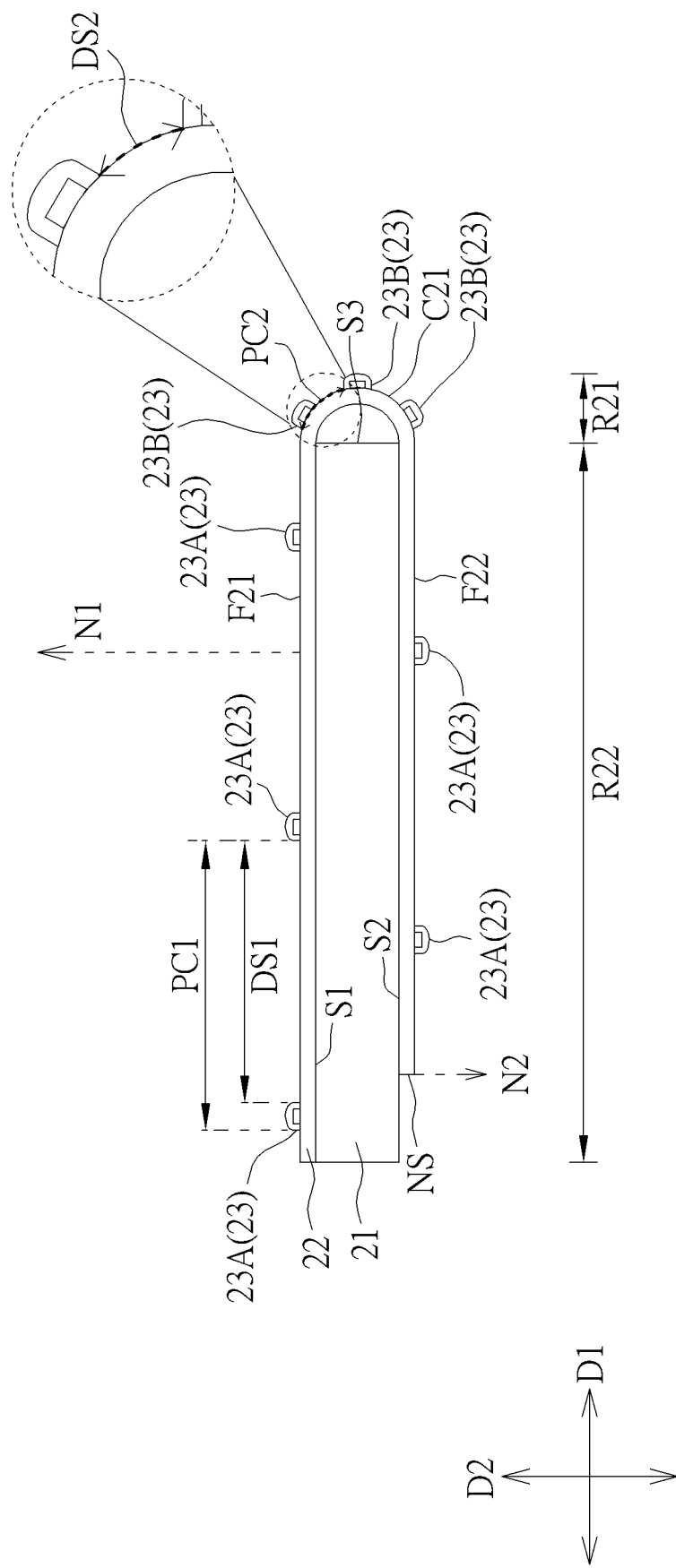
FIG. 2 is a cross-sectional schematic diagram illustrating a part of an electromagnetic wave emitting structure according to an embodiment of the present disclosure.

Please refer to FIG. 1 and FIG. 2. FIG. 2 is a cross-sectional schematic diagram illustrating a part of an electromagnetic wave emitting structure according to an embodiment of the present disclosure. In some embodiments, the flat portion R12 of the panel 10 may have a first flat surface Flt (such as an outer surface of a part of the second polarization element 15) and/or a second flat surface F12 (such as an outer surface of another part of the second polarization element 15). The first flat surface F11 is disposed adjacent to or corresponding to the first surface S1, and the second flat surface F12 is disposed adjacent to or corresponding to the second surface S2. In some embodiments, the first curved portion R11 may include a curved surface C11 connected with the first flat surface D11 and/or the second flat surface F12. Similarly, in some embodiments, the electromagnetic wave emitting structure 20 may have a first flat surface F21 (such as an outer surface of a part of the substrate 22) and/or a second flat surface F22 (such as an outer surface of a part of the substrate 22). The first flat surface F21 is disposed adjacent to or corresponding to the first surface S1, and the second flat surface F22 is disposed adjacent to or corresponding to the second surface S2. In some embodiments, the substrate 22 in (or included in) the second curved portion R21 of the electromagnetic wave emitting structure 20 may have a curved surface C21 connected with the first flat surface F21 and/or the second flat surface F22.

Please refer to FIG. 2. In some embodiments, a portion of the electromagnetic wave emitting units 23 may be disposed on the substrate 22 in (or included in) the flat portion R22, and another portion of the electromagnetic wave emitting units 23 may be disposed on the substrate 22 in (or included in) the second curved portion R21, but not limited thereto. For example, the electromagnetic wave emitting units 23 may include a plurality of first electromagnetic wave emitting units 23A and a plurality of second electromagnetic wave emitting units 23B. The plurality of first electromagnetic wave emitting units 23A may be in the flat portion R22 (i.e. being disposed on the substrate 22 in (or included in) the flat portion R22), and the plurality of second electromagnetic wave emitting units 23B may be in the second curved portion R21 (i.e. being disposed on the substrate 22 in (or included in) the second curved portion R21). In some embodiments, the plurality of first electromagnetic wave emitting units 23A may have a first pitch PC1, the plurality of second electromagnetic wave emitting units 23B may have a second pitch PC2, and the second pitch PC2 may be equal to or different from the first pitch PC1. In some embodiments, the second pitch PC2 may be less than the first pitch PC1. The first pitch PC1 may be defined as a pitch between two of the first electromagnetic wave emitting units 23A adjacent to each other on the first flat surface F21, and the second pitch PC2 may be defined as a pitch between two of the second electromagnetic wave emitting units 23B adjacent to each other on the curved surface C21. In some embodiments, a first distance DS1 between adjacent ones of the plurality of first electromagnetic wave emitting units 23A may be equal to or different from a second distance DS between adjacent ones of the plurality of second electromagnetic wave emitting units 23B. The first distance DS1 may be defined as the shortest distance between two of the first electromagnetic wave emitting units 23A adjacent to each other on the first flat surface F21, and the second distance DS2 may be defined as the shortest distance between two of the second electromagnetic wave emitting units 23B adjacent to each other on the curved surface C21. In some embodiments, the second distance DS2 may be less than the first distance DS1, but not limited thereto. In other embodiments (not shown), the electromagnetic wave emitting units 23 may include a plurality of the first electromagnetic wave emitting units 23A and at least one second electromagnetic wave emitting unit 23B. For example, when there is only one second electromagnetic wave emitting unit 23B, the second pitch PC2 may be defined as a pitch between the second electromagnetic wave emitting unit 23B and one of the first electromagnetic wave emitting units 23A adjacent to this second electromagnetic wave emitting unit 23B on a surface (a surface extending from the first flat surface F21 to the curved surface C21), and the second distance DS2 may be defined as the shortest distance between the second electromagnetic wave emitting unit 23B and one of the first electromagnetic wave emitting units 23A adjacent to this second electromagnetic wave emitting unit 23B on a surface (a surface extending from the first flat surface F21 to the curved surface C21). In other embodiments (not shown), the second pitch PC2 may be greater than the first pitch PC1 according to some design considerations, or the second distance DS2 may be greater than the first distance DS1.

Please refer to FIG. 1 and FIG. 2. In some embodiments, the curved surface C11 of the first curved portion R11 may be regarded as a light emitting surface at the lateral side of the electronic device 101, the first flat surface F11 of the flat portion R12 may be regarded as a light emitting surface at the front side, and the second flat surface F12 of the flat portion R12 may be regarded as a light emitting surface at the back side. In some embodiments, the electromagnetic wave generated by or emitted from the second electromagnetic wave emitting unit 23B in the second curved portion R21 may pass through the panel 10 and be emitted toward the curved surface C11 roughly, and the electromagnetic wave generated by or emitted from the first electromagnetic wave emitting unit 23A in the flat portion R22 may pass through the panel 10 and be emitted toward the first flat surface F11 and/or the second flat surface F12 roughly, but not limited thereto. In some embodiments (such as the embodiment of FIG. 2), the first electromagnetic wave emitting units 23A may be disposed on a part of the substrate 22 located on the first surface S1 and a part of the substrate 22 located on the second surface S2, and the second electromagnetic wave emitting units 23B may be disposed on a part of the substrate 22 in (or included in) the second curved portion R21 for performing functional operations on the front side, the lateral side, and the back side of the electronic device 101, but not limited thereto. In other embodiments, the second electromagnetic wave emitting units 23B may not be disposed on the part of the substrate 22 located on the second surface S2.

In some embodiments, the substrate 22, the first substrate 12, and the second substrate 14 described above may have the same thickness or different thicknesses according to the materials and/or the degree of bending. For example, the radius of curvature of the substrate 22 in the second curved portion R21 may be relatively less than the radius of curvature of the first substrate 12 in the first curved portion R11 and/or the radius of curvature of the second substrate 14 in the first curved portion R11, and the thickness TK2 of the substrate 22 may be designed to be less than a thickness TK1 of the first substrate 12 and/or a thickness TK1' of the second substrate 14 for realizing the bending condition with small radius of curvature, but not limited thereto. In some embodiment, the thickness TK2 of the substrate 22 may be less than 30 micrometers, but not limited thereto. In some embodiments, the thickness TK1 of the first substrate 12 and/or the thickness TK1' of the second substrate 14 may range from 5 micrometers (um) to 50 micrometers (5 micrometers≤thickness≤50 micrometers), or respectively range from 10 micrometers to 40 micrometers (10 micrometers≤thickness≤40 micrometers), but not limited thereto.

Please refer to FIG. 2. In some embodiments, the substrate 22 may be bent and extend, and an end portion NS of the substrate 22 may be located on the second surface S2 of the support element 21. The first flat surface F11 of the substrate 22 in (or included in) the flat portion R22 may have a first normal direction N1, a surface of the end portion NS of the substrate 22 may have a second normal direction N2, the end portion NS of the substrate 22 may be in (or included in) the second curved portion or the flat portion R22, and an included angle between the first normal direction N1 and the second normal direction N2 may be greater than or equal to 90 degrees and less than or equal to 180 degrees, but not limited thereto. As describe above, when the end portion of the substrate 22 is located on the second surface S2, the included angle between the first normal direction N1 and the second normal direction N2 may be close to 180 degrees, but not limited thereto.

In other embodiments (not shown), the end portion NS of the substrate 22 may not extend to be located on the second surface S2, and the end portion NS of the substrate 22 may be in the second curved portion R21. As describe above, when end portion NS of the substrate 22 is in the second curved portion R21, the included angle between the first normal direction N1 and the second normal direction N2 may be substantially greater than or equal to 90 degrees and less than 180 degrees, but not limited thereto. In other words, a part of the substrate 22 is in (or included in) the flat portion R22 and a part of the substrate 22 is in (or included in) the second curved portion R21, the part of the substrate 22 in (or included in) the flat portion R22 has a first normal direction N1, the another part of the substrate 22 in (or included in) the second curved portion R21 (the end portion NS) has a second normal direction N2, and an included angle between the first normal direction N1 and the second normal direction N2 is greater than or equal to 90 degrees and less than or equal to 180 degrees. In other embodiments (not shown), the included angle between the first normal direction N1 and the second normal direction N2 may be greater than or equal to 20 degrees and less than or equal to 90 degrees.

In some embodiments, a gap may exist between the part of the substrate 22 in (or included in) the second curved portion R21 and the side surface S3 of the support element 21, and the gap may be filled with other materials (such as glue, not shown) selectively or other materials (such as glue, not shown) may be disposed in the gap for improving the adhesion or bonding between the support element 21 and the substrate 22 in the second curved portion R21. In some embodiments (not shown), other parts (such as glue and/or spacer) may be disposed between the substrate 22 and the panel 10 for improving the bonding between the panel 10 and the electromagnetic wave emitting structure 20, but not limited thereto.

Please refer to FIG. 1. In some embodiments, the electronic device 101 may further include a first circuit structure 91 electrically connected with the panel 10, and the first circuit structure 91 may be electrically connected with parts (such as electrically conductive pads, not shown) on the first substrate 12 and/or the second substrate 14. For example, the first circuit structure 91 may be disposed on the first substrate 12 away from the first surface S1, and the first circuit structure 91 may be electrically connected with the parts (such as electrically conductive pads, not shown) on the first substrate 12, but not limited thereto. In some embodiments, the electronic device 101 may further include a second circuit structure 92 electrically connected with the electromagnetic wave emitting structure 20 (such as the electromagnetic wave emitting units 23). For example, the second circuit structure 92 may be disposed on the substrate 22 and disposed away from the first surface S1. In some embodiments, the first circuit structure 91 and/or the second circuit structure 92 may include a printed circuit board (PCB), a tap carrier package (TCP) structure, a chip on film (COF) structure, other suitable circuit structures, or a combination thereof. In some embodiments, in a vertical direction D2 (or on a normal direction of the support element 21), the first circuit structure 91 may overlap the second circuit structure 92. In some embodiments, viewed in the vertical direction D2 (the top-view direction of the electronic device 101), the first circuit structure 91 and/or the second circuit structure 92 may overlap the flat portion R12, and the first circuit structure 91 and/or the second circuit structure 92 may be disposed adjacent to the second surface S2 for reducing the impact of the first circuit structure 91 and/or the second circuit structure 92 on the function of the electronic device 101 or the visibility of the first circuit structure 91 and/or the second circuit structure 92 for the user in appearance, but not limited thereto. In some embodiments, the first circuit structure 91 and the second circuit structure 92 may be electrically connected with each other (via traces and/or leads, for example) according to some design considerations, but not limited thereto.

The following description will detail the different embodiments of the present disclosure. To simplify the description, the following description will detail the dissimilarities among different embodiments and the identical features will not be redundantly described. In addition, identical components in each of the following embodiments are marked with identical symbols for making it easier to understand the differences between the embodiments. The features in each of the embodiments may be mixed or combined without departing from the spirit of the present disclosure or conflicting with each other.

Figure 3:
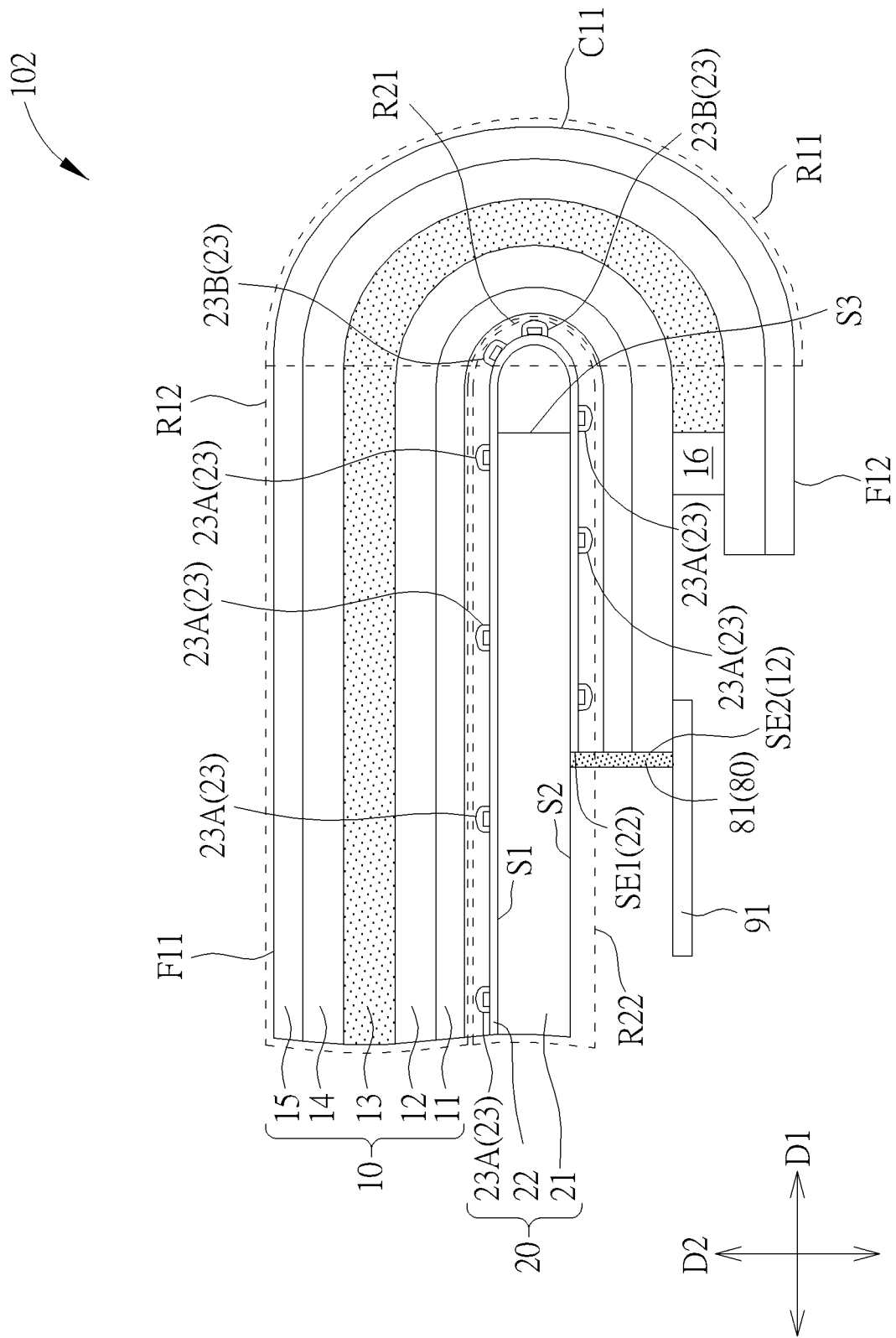
FIG. 3 is a cross-sectional schematic diagram illustrating a part of an electronic device according to a second embodiment of the present disclosure.

Please refer to FIG. 3. FIG. 3 is a cross-sectional schematic diagram illustrating a part of an electronic device 102 according to a second embodiment of the present disclosure. As shown in FIG. 3, the electronic device 102 may further include a connection structure 80, the first circuit structure 91 may be electrically connected with the electromagnetic wave emitting units 23 of the electromagnetic wave emitting structure 20 via the connection structure 80 and electrically conductive pads (not shown) on the substrate 22, and the second circuit structure in the first embodiment described above will not be needed accordingly, but not limited thereto. In some embodiments, the connection structure 80 may include an electrically conductive material 81, such as metal, a transparent electrically conducive layer, or a combination thereof. In some embodiments, the connection structure 80 may be formed by screen printing or other suitable methods, but not limited thereto. In some embodiments, the connection structure 80 may be partly disposed on a lateral side SE1 of the substrate 22 and/or on a lateral side SE2 of the first substrate 12 and connected with the first circuit structure 91. The electrically conductive material 81 may be a lateral side electrically conductive pattern, but not limited thereto. In some embodiments, the connection structure 80 may include a plurality of electrically conductive lines (not shown) for electrically connecting the first circuit structure 91 and the electromagnetic wave emitting units 23. In some embodiments (not shown), other protection structures (not shown) may be disposed at an outer side of the connection structure 80 for reducing the chance of damage or oxidation of the connection structure 80. The electrically conductive material 81 may be applied in other embodiments according to some design considerations.

Figure 4:
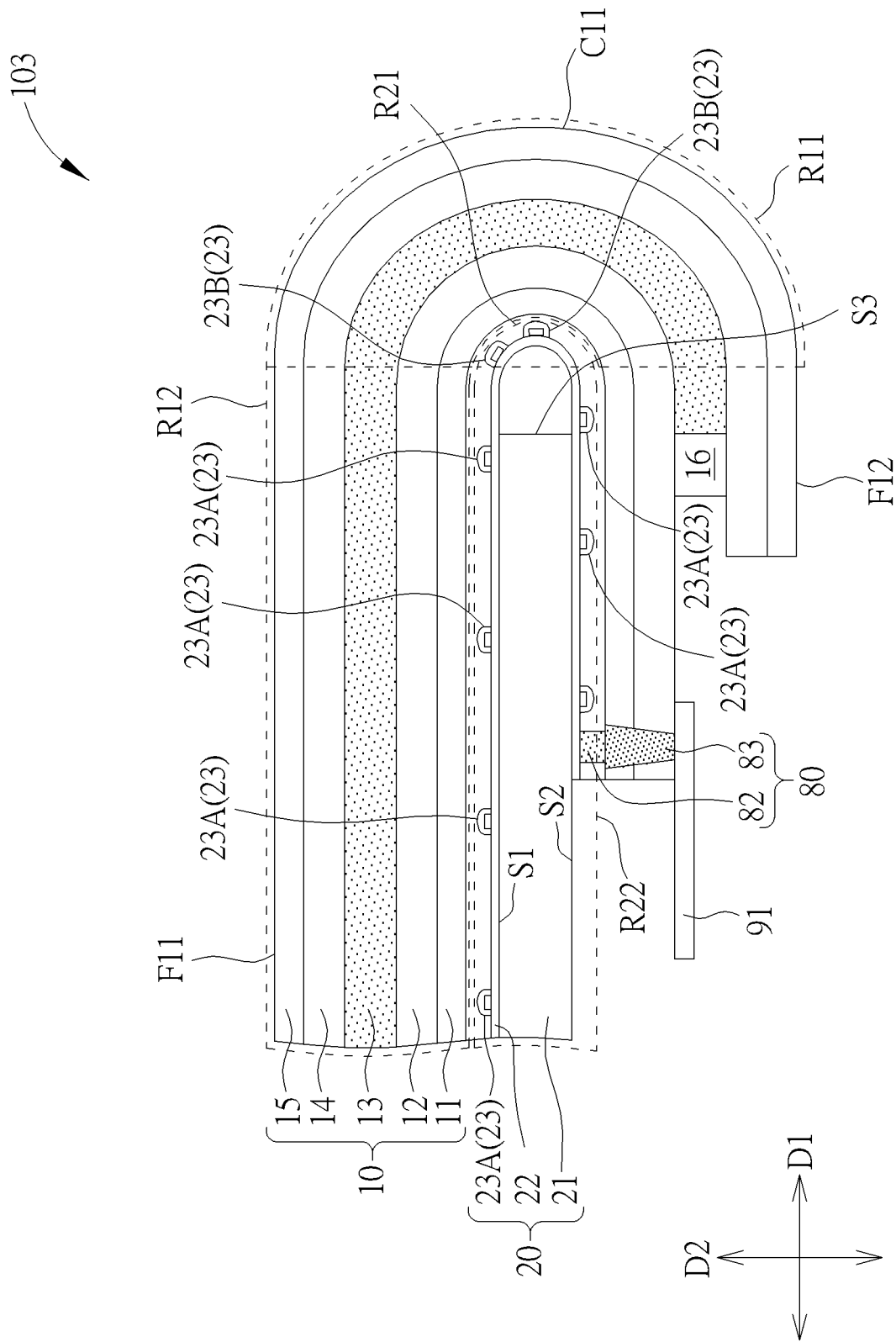
FIG. 4 is a cross-sectional schematic diagram illustrating a part of an electronic device according to a third embodiment of the present disclosure.

Please refer to FIG. 4. FIG. 4 is a cross-sectional schematic diagram illustrating a part of an electronic device 103 according to a third embodiment of the present disclosure. As shown in FIG. 4, in the electronic device 103, the connection structure 80 may include an electrically conductive pad 82 and a via structure 83. The electrically conductive pad 82 may be disposed on the substrate 22, and the via structure 83 may penetrate through the first substrate 12 and/or the first polarization element 11. The first circuit structure 91 is electrically connected with the electrically conductive pad 82 through the via structure 83, and the electrically conductive pad 82 is electrically connected with the electromagnetic wave emitting units 23. In some embodiments (not shown), the location of the first polarization element 11 or the dimension of the first polarization element 11 may be modified according to some design considerations for electrically connecting the first circuit structure 91 and the electrically conductive pad 82 while the via structure 83 does not penetrate through the first polarization element 11 selectively. The electrically conductive pad 82 and the via structure 83 in this embodiment may be applied in other embodiments according to some design considerations.

Figure 5:
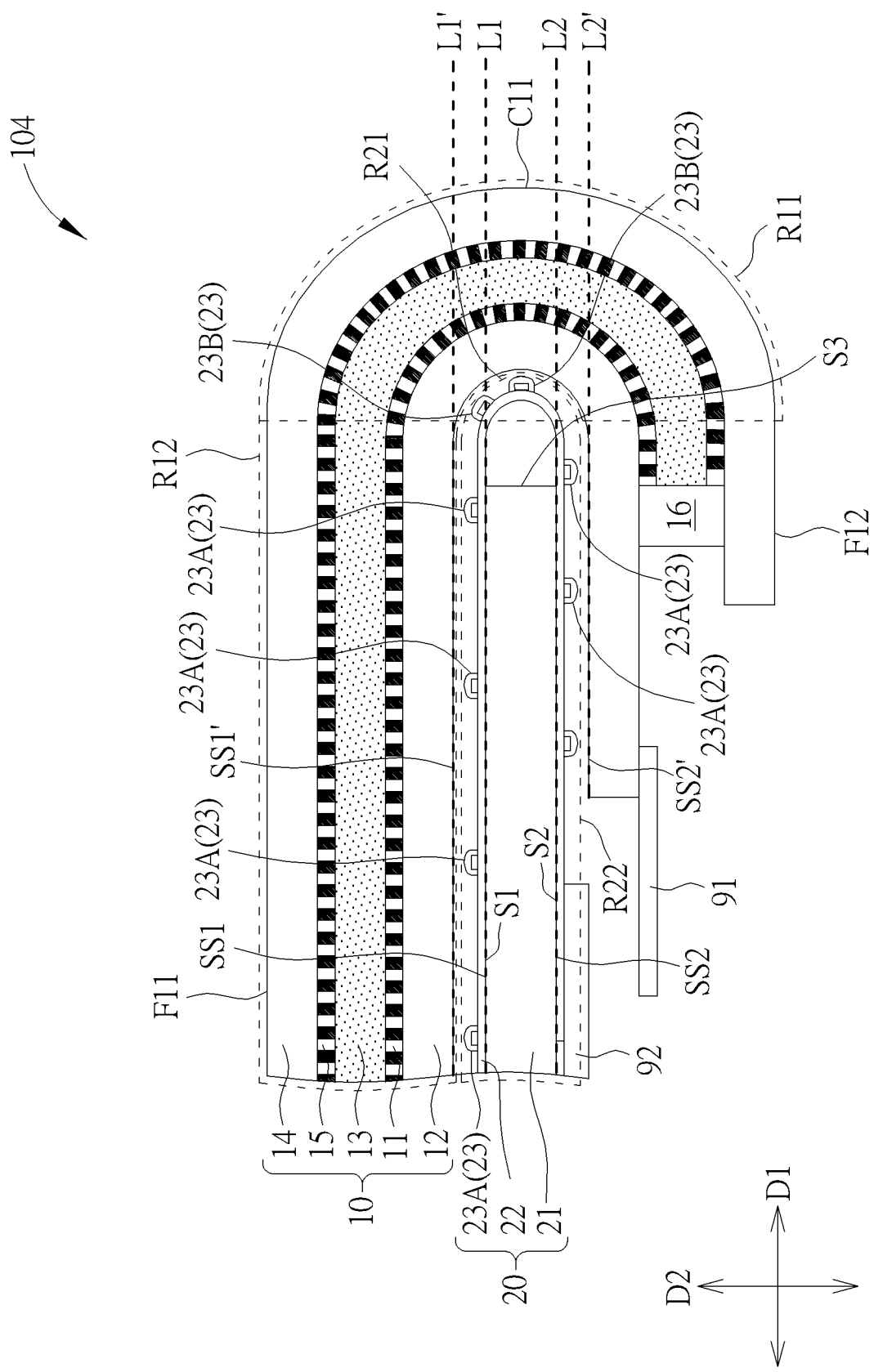
FIG. 5 is a cross-sectional schematic diagram illustrating a part of an electronic device according to a fourth embodiment of the present disclosure.

Please refer to FIG. 5. FIG. 5 is a cross-sectional schematic diagram illustrating a part of an electronic device 104 according to a fourth embodiment of the present disclosure. As shown in FIG. 5, in the electronic device 104, the first substrate 12 is disposed between the medium layer 13 and the electromagnetic wave emitting structure 20, the first polarization element 11 may be disposed between the first substrate 12 and the medium layer 13, and the second polarization element 15 may be disposed between the second substrate 14 and the medium layer 13, but not limited thereto. In some embodiments, the first polarization element 11 and the second polarization element 15 may respectively include a wire grid polarizer (WGP), but not limited thereto. In some embodiments, the thickness of the first polarization element 11 and/or the thickness of the second polarization element 15 may be less than 10 micrometers, for example, but not limited thereto. In some embodiments, at least one of the first polarization element 11 or the second polarization element 15 may be disposed between the medium layer 13 and a substrate of the panel 10 (such as the first substrate 12 or the second substrate 14). In addition, the structures and the locations of the first polarization element 11 and the second polarization element 15 may also be applied in other embodiments.

Figure 6:
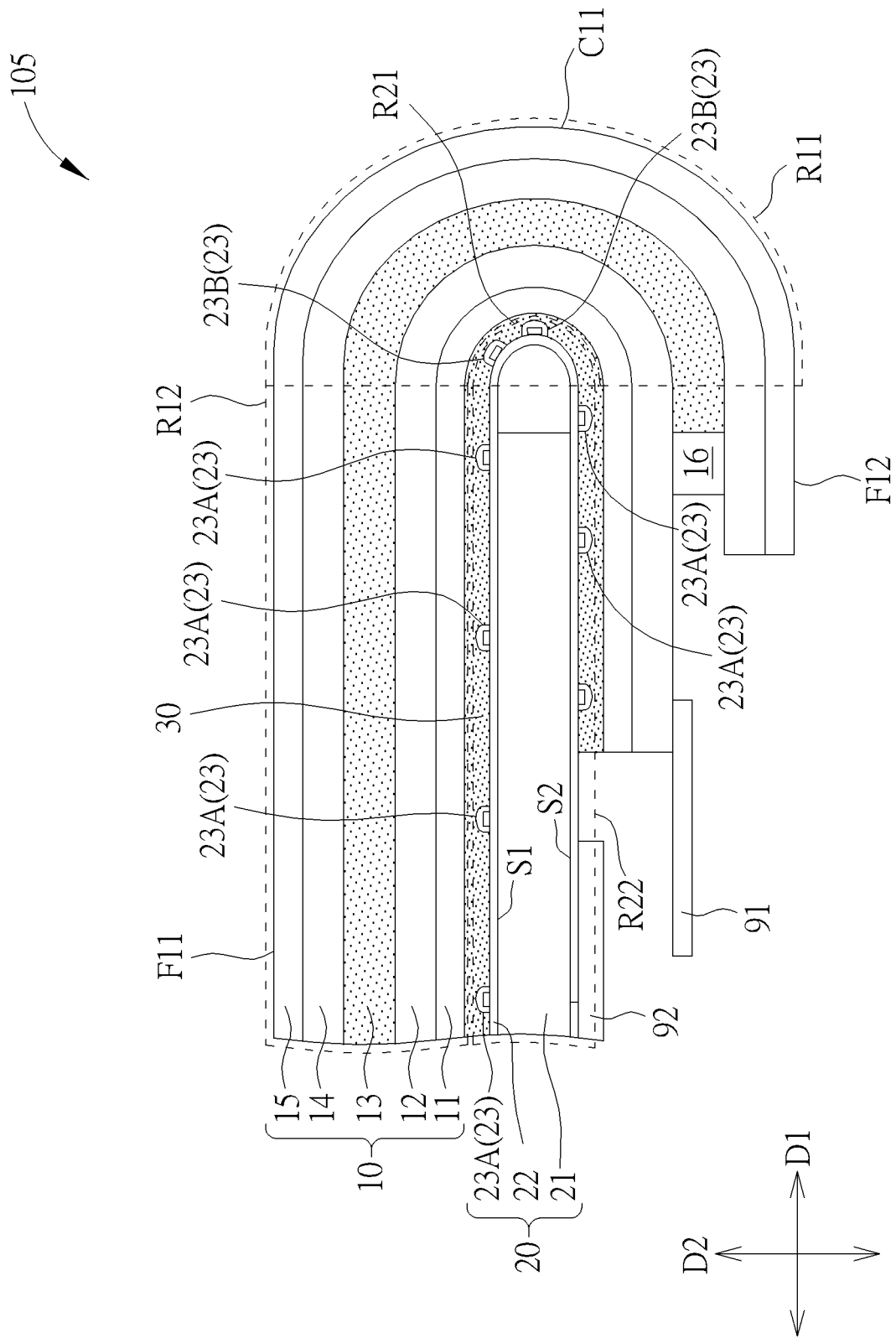
FIG. 6 is a cross-sectional schematic diagram illustrating a part of an electronic device according to a fifth embodiment of the present disclosure.

Please refer to FIG. 6. FIG. 6 is a cross-sectional schematic diagram illustrating a part of an electronic device 105 according to a fifth embodiment of the present disclosure. As shown in FIG. 6, the electronic device 105 may further include a function layer 30 disposed between the panel 10 and the electromagnetic wave emitting structure 20. In some embodiments, the function layer 30 may include a diffusion plate, an adhesive layer, an encapsulation layer, a heat dissipation layer, a stress modulation layer, a brightening film, structures and/or materials having other functions, or a combination thereof, but not limited thereto. In some embodiments, the function layer 30 may selectively contact the panel 10 and/or the e electromagnetic wave emitting structure 20, or not. In other embodiments (not shown), the function layer 30 may selectively protrude or retract from the panel 10. In addition, the function layer 30 may be applied to other embodiments.

Figure 7:
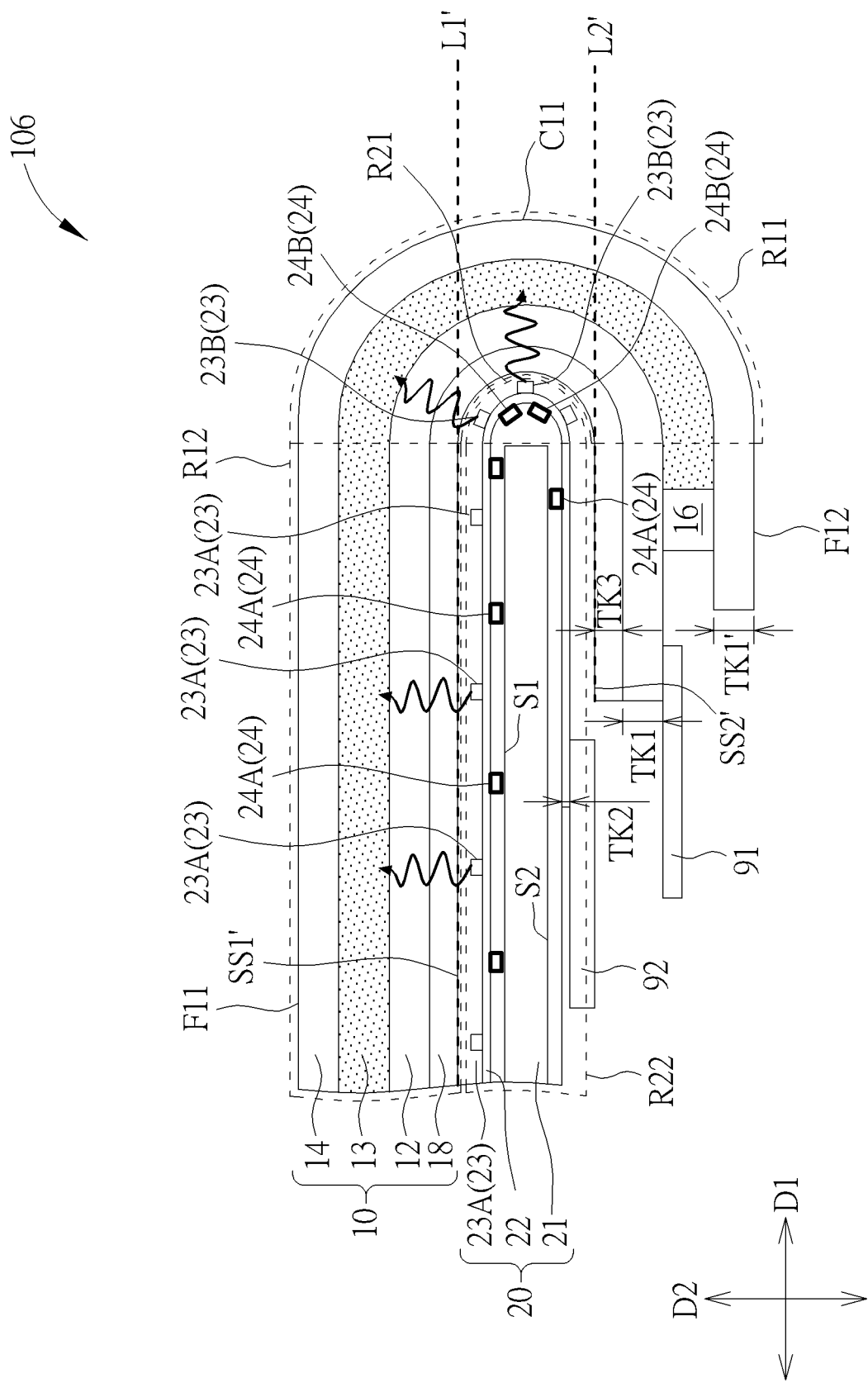
FIG. 7 is a cross-sectional schematic diagram illustrating a part of an electronic device according to a sixth embodiment of the present disclosure.

Please refer to FIG. 7. FIG. 7 is a cross-sectional schematic diagram illustrating a part of an electronic device 106 according to a sixth embodiment of the present disclosure. The electronic device 106 may be an antenna structure (such as a liquid crystal antenna), but not limited thereto. In some embodiments, the electronic device 106 may include a plurality of electromagnetic wave receiving units 24 disposed on the substrate 22 for receiving electromagnetic waves. In some embodiments, the electromagnetic wave receiving units 24 may be located between the support element 21 and the substrate 22. In other words, the electromagnetic wave receiving units 24 and the electromagnetic wave emitting units 23 may be located on different surfaces of the substrate 22, but not limited thereto. In some embodiments (not shown), the electromagnetic wave receiving units 24 and the electromagnetic wave emitting units 23 may be located on the same surface of the substrate 22, but not limited thereto. In some embodiments, the electromagnetic wave receiving units 24 and the electromagnetic wave emitting units 23 may be located on may be disposed alternately. In other words, in the vertical direction D2, the electromagnetic wave receiving unit 24 may not overlap the electromagnetic wave emitting unit 23 for reducing the interference therebetween, but not limited thereto. In some embodiments, the electromagnetic wave receiving units 24 may include a plurality of first electromagnetic wave receiving units 24A and a plurality of second electromagnetic wave receiving units 24B. The first electromagnetic wave receiving units 24A are in the flat portion R22, and the second electromagnetic wave receiving units 24B are in the second curved portion R21. The pitch and the minimum distance between two of the first electromagnetic wave receiving units 24A adjacent to each other may be equal to the pitch and the minimum distance between two of the second electromagnetic wave receiving units 24B adjacent to each other or not according to some design considerations. The definitions of the pitch and/or the minimum distance between the first electromagnetic wave receiving units 24A may be similar to those of the first electromagnetic wave emitting units 23A described above and the definitions of the pitch and/or the minimum distance between the second electromagnetic wave receiving units 24B may be similar to those of the second electromagnetic wave emitting units 23B described above and will not be redundantly described. In some embodiments, the pitch and/or the minimum distance between two of the second electromagnetic wave receiving units 24B adjacent to each other may be less than or greater than the pitch and the minimum distance between two of the first electromagnetic wave receiving units 24A adjacent to each other. In some embodiments, the panel 10 of the electronic device 106 may further include a support substrate 18 optionally, and the support substrate 18 may be disposed between the first substrate 12 and the electromagnetic wave emitting structure 20, but not limited thereto. In some embodiments, the material of the support substrate 18 may be different from the material of the first substrate 12. For example, the material of the support substrate 18 may include polyethylene terephthalate (PET), the material o the first substrate 12 may include polyimide (PI), but not limited thereto. In some embodiments, the hardness and/or the Young's modulus of the support substrate 18 may be greater than the hardness and/or the Young's modulus of the first substrate 12 and/or the hardness and/or the Young's modulus of the second substrate 14 for providing support. In some embodiments, a thickness TK3 of the support substrate 18 may be equal to or different from the thickness TK1 of the first substrate 12 and/or the thickness TK1' of the second substrate 14. In some embodiments, the thickness TK3 of the support substrate 18 may be greater than the thickness TK1 of the first substrate 12 and/or the thickness TK1' of the second substrate 14. In some embodiments, the thickness TK3 of the support substrate 18 may be greater than 100 micrometers, and the thickness TK1 of the first substrate 12 may range from 10 micrometers to 20 micrometers (10 micrometers≤thickness≤20 micrometers), but not limited thereto. In some embodiments, the electromagnetic wave receiving units 24 and/or the electromagnetic wave emitting units 23 may contact the support element 21, the electromagnetic wave receiving units 24 and/or the electromagnetic wave emitting units 23 may be bonded with, or be attached to the support element 21 via other parts (such as an adhesive layer, an encapsulation layer, or other suitable materials), but not limited thereto.

Figure 8:
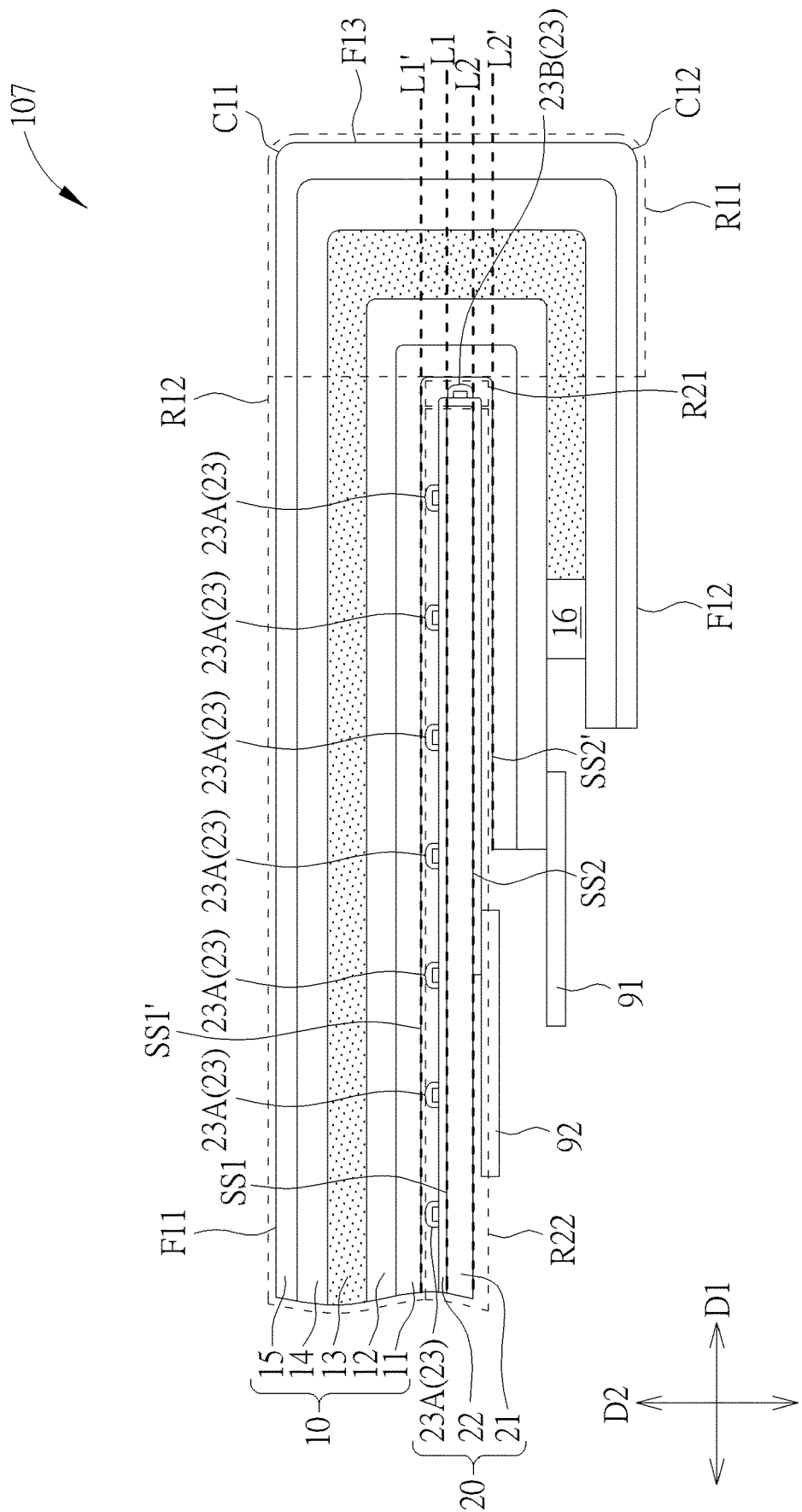
FIG. 8 is a cross-sectional schematic diagram illustrating a part of an electronic device according to a seventh embodiment of the present disclosure.

Please refer to FIG. 8. FIG. 8 is a cross-sectional schematic diagram illustrating a part of an electronic device 107 according to a seventh embodiment of the present disclosure. As shown in FIG. 8, in the electronic device 107, the first curved portion R11 of the panel 10 may have the curved surface C11, a curved surface C12, and/or a flat surface F13, and the flat surface F13 may be located between or connected with the curved surface C11 and the curved surface C12, but not limited thereto. In some embodiments, the curved surface C11 may be located between or connected with the first flat surface F11 and the flat surface F13, and the curved surface C12 may be located between the flat surface F13 and the second flat surface F12, but not limited thereto. In some embodiments, an included angle between a normal direction (not shown) of the flat surface F13 of the first curved portion R11 and a normal direction (not shown) of the first flat surface F11 of the flat portion R12 may substantially range from 80 degrees to 100 degrees (80 degrees≤included angle≤100 degrees), but not limited thereto. In some embodiments, the curved surface C11 and/or the curved surface C12 may be replaced with an inclined surface or other irregular surfaces according to some design considerations, but not limited thereto. In some embodiments, the flat surface F13 of the first curved portion R11 may be a light emitting surface at the lateral side of the electronic device 107, and the electromagnetic wave generated by the second electromagnetic wave emitting units 23B in the second curved portion R21 may pass through the panel 10 and be emitted towards the flat surface F13, but not limited thereto. In some embodiments, according to the design of the light-emitting angle of the second electromagnetic wave emitting units 23B, the electromagnetic wave generated by the second electromagnetic wave emitting units 23B may pass through the panel 10 and be partly emitted towards the first flat surface F11, the second flat surface F12, the curved surface C11, and/or the curved surface C12, but not limited thereto. Additionally, in some embodiments, the amount and/or the density of the electromagnetic wave emitting units 23 corresponding to the flat surface F13 may be different from the amount and/or the density of the electromagnetic wave emitting units 23 corresponding to the first flat surface F11, but not limited thereto.

Figure 9:
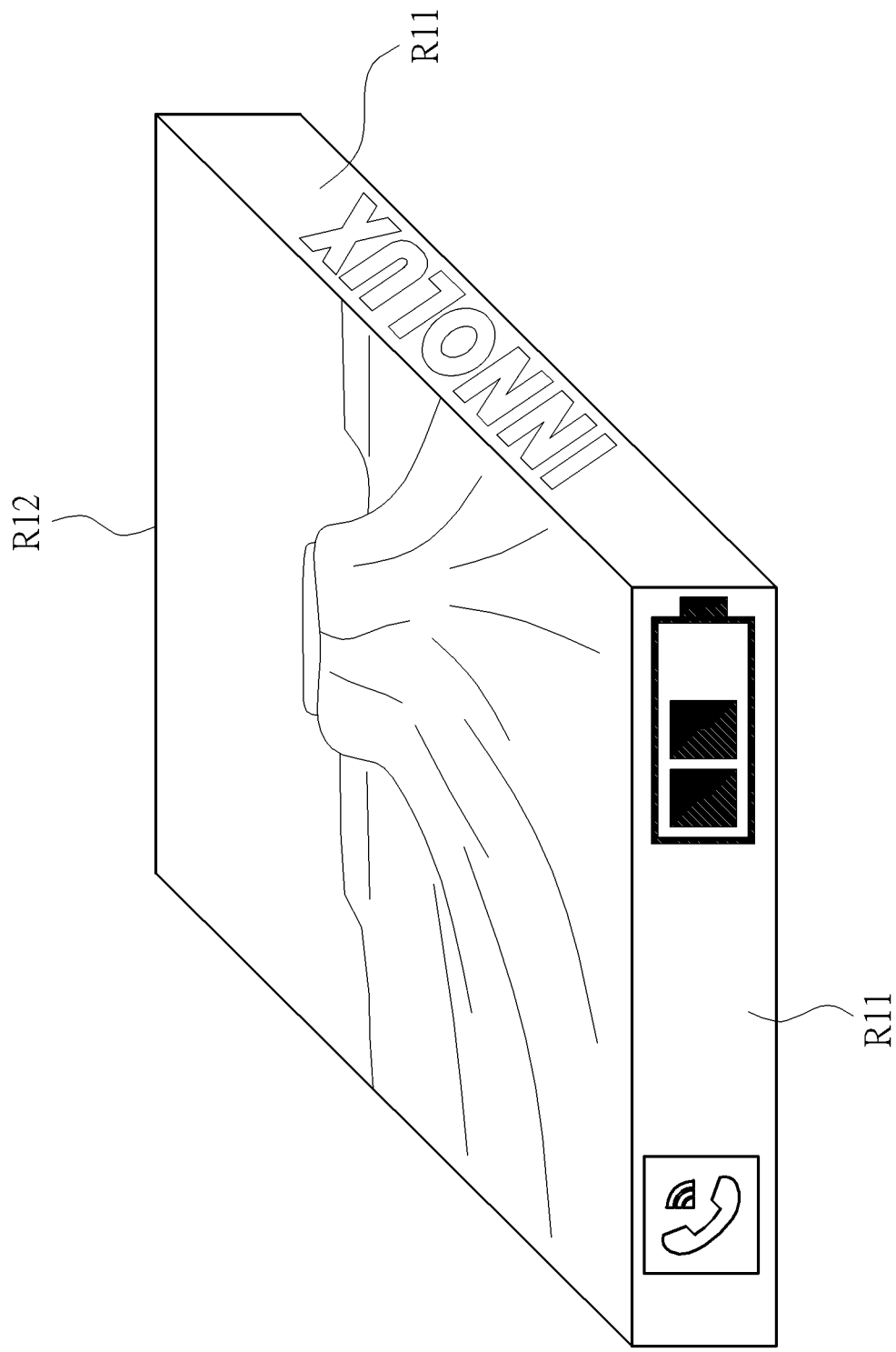
FIG. 9 is a schematic diagram illustrating display effect of an electronic device according to an embodiment of the present disclosure.

Please refer to FIG. 9, FIG. 1, FIG. 3, FIG. 4, FIG. 5, FIG. 6, and FIG. 8. FIG. 9 is a schematic diagram illustrating display effect of an electronic device according to an embodiment of the present disclosure. In some embodiments, the electronic device (such as a display device) may include at least one first curved portion R11. The at least one first curved portion R11 may be adjacent to different lateral sides of the flat portion R12, and the at least one first curved portion R11 and the flat portion R12 may be used to display different images. In some embodiments, at least two first curved portions R11 may be disposed adjacent to each other, but not limited thereto. In some embodiments, the resolution of the image displayed by the flat portion R12 may be equal to or different from the resolution of the image displayed by at least one first curved portion R11. For example, the resolution of the image displayed by the flat portion R12 may be higher than or lower than the resolution of the image displayed by the first curved portion R11, but not limited thereto. In some embodiments, the image displayed by the flat portion R12 and the image displayed by the first curved portion R11 may be controlled or operated separately. In some embodiments, the front side display condition and the lateral side display condition of the display device may be determined by controlling the operation corresponding to the first electromagnetic wave emitting units 23A in the flat portion R12 and the operation corresponding to the second electromagnetic wave emitting units 23B in the first curved portion R11 respectively, but not limited thereto. In some embodiments, the image on the lateral side may be not displayed the image. For example, when the electronic device is a touch display device, touching the electronic device under the stand-by mode may trigger the first curved portion R11 to display the image on the lateral side first. At this time, the second electromagnetic wave emitting units 23B in the first curved portion R11 may be turned on, and the first electromagnetic wave emitting units 23A in the flat portion R12 may be turned off. In addition, the image on the front side may be displayed by the flat portion R12 subsequently by an unlock operation, and the first electromagnetic wave emitting units 23A in the flat portion R12 may be turned on accordingly. In some embodiments, the flat portion R12 may be used to display variable images, and the first curved portion R11 may be used to display relatively fixed image (such as device and/or brand name, battery indicator, call notification, message notification, etc.), but not limited thereto.

To summarize the above descriptions, according to the electronic device in the present disclosure, some of the electromagnetic wave emitting units may be in the second curved portion (corresponding to the first curved portion of the panel) of the electromagnetic wave emitting structure for improving the related operation performance at the curved portion (roughly corresponding to the lateral side) of the electronic device.

Although the embodiments and advantages thereof in the present disclosure have been disclosed as above, it should be understood that anyone with ordinary knowledge in the related technical field can make changes, substitutions, and decorations without departing from the spirit and the scope of this disclosure. Additionally, the scope of the protected range of this disclosure is not limited to the processes, machines, manufacturing, material compositions, devices, methods, and steps in the specific embodiments described in the description. Any person with ordinary knowledge in the related technical field may understand the current or future development of processes, machines, manufacturing, material composition, devices, methods and steps from the disclosed contents in this disclosure, as long as the substantially same functions carried out in the described embodiments or the substantially same results obtained in the described embodiments may be used in accordance with the present disclosure. Therefore, the protection scope of the present disclosure includes the above-mentioned processes, machines, manufacturing, material composition, devices, methods and steps. Additionally, each claim constitutes a separate embodiment, and the protection scope of the present disclosure also includes a combination of the claims and the embodiments. The protection scope of the present disclosure shall be determined by the scope of the claims listed below.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic structure, comprising:
   a substrate having a first flat part and a curved part connected with the first flat part;
   a plurality of electronic units disposed on the substrate, wherein two adjacent ones of the plurality of electronic units on the first flat part have a first pitch in a first direction parallel to a surface of the first flat part, another two adjacent ones of the plurality of electronic units on the curved part have a second pitch in a second direction parallel to a surface of the curved part, and the second pitch is different from the first pitch;
   a circuit structure electrically connected with at least one of the plurality of electronic units, wherein in a normal direction of the first flat part, at least a portion of the circuit structure overlaps a region between another two of the plurality of electronic units on the first flat part; and
   a support element disposed under the substrate, wherein the circuit structure is disposed under the support element.

2. The electronic structure according to claim 1, wherein the second pitch is less than the first pitch.

3. The electronic structure according to claim 1, wherein the plurality of electronic units are a plurality of light emitting units.

4. The electronic structure according to claim 1, wherein a thickness of the support element is greater than a thickness of the substrate.

5. The electronic structure according to claim 1, further comprising:
   an encapsulation layer disposed on the plurality of electronic units.

6. The electronic structure according to claim 1, wherein the substrate further has a second flat part, the curved part connects between the first flat part and the second flat part, and further another two adjacent ones of the plurality of electronic units on the second flat part have a third pitch in a third direction parallel to a surface of the second flat part, wherein the third pitch is different from the second pitch.

7. The electronic structure according to claim 6, wherein the first pitch is equal to the third pitch.

8. The electronic structure according to claim 1, wherein a first distance between the two adjacent ones of the plurality of electronic units on the first flat part is different from a second distance between the another two adjacent ones of the plurality of electronic units on the curved part.

9. The electronic structure according to claim 8, wherein the second distance is less than the first distance.

* * * * *